(12) United States Patent
Rakshit et al.

(10) Patent No.: US 11,227,126 B2
(45) Date of Patent: Jan. 18, 2022

(54) ASSOCIATING CHARACTERS TO STORY TOPICS DERIVED FROM SOCIAL MEDIA CONTENT

(71) Applicant: International Business Machines Corporation, Armonk, NY (US)

(72) Inventors: Sarbajit K. Rakshit, Kolkata (IN); Victor Povar, Vancouver (CA); Craig M. Trim, Sylmar, CA (US); Michael Kevin Boudreau, Orange, CA (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 16/435,590

(22) Filed: Jun. 10, 2019

(65) Prior Publication Data

US 2019/0340250 A1    Nov. 7, 2019

Related U.S. Application Data

(63) Continuation-in-part of application No. 15/969,174, filed on May 2, 2018, now abandoned.

(51) Int. Cl.
*G06F 40/56* (2020.01)
*G06Q 50/00* (2012.01)
(Continued)

(52) U.S. Cl.
CPC .......... *G06F 40/56* (2020.01); *G06F 16/9536* (2019.01); *G06F 40/295* (2020.01); *G06Q 50/01* (2013.01)

(58) Field of Classification Search
CPC ...... G06F 17/28; G06F 16/9536; G06F 17/27; G06F 40/30; G06F 40/56; G06F 40/295;
(Continued)

(56) References Cited

U.S. PATENT DOCUMENTS 7,886,000 B1    2/2011  Polis
8,990,065 B2    3/2015  Raskino
(Continued)

OTHER PUBLICATIONS

Groza et al., "Information retrieval in folktales using natural language processing", arXiv:1511.03012v1 [cs.CL] Nov. 10, 2015, 8 pages.
(Continued)

*Primary Examiner* — Md S Elahee
(74) *Attorney, Agent, or Firm* — Stephanie L. Carusillo

(57) ABSTRACT

In an approach to generating a story topic, one or more computer processors detect biometric data associated with one or more users, where the users are interacting with at least one social media content. The one or more computer processors collect the at least one social media content. The one or more computer processors analyze the biometric data and the at least one social media content. The one or more computer processors determine whether a popularity of the social media content meets a predetermined threshold. The one or more computer processors extract one or more keywords and one or more concepts from the social media content. Based on the extracted one or more keywords and one or more concepts The one or more computer processors generate one or more story topics. The one or more computer processors generate a report that includes the one or more story topics.

20 Claims, 6 Drawing Sheets

(51) Int. Cl.
*G06F 16/9536* (2019.01)
*G06F 40/295* (2020.01)

(58) Field of Classification Search
CPC ........ G06F 17/30038; G06F 17/30867; G06Q
50/00; G06Q 50/01; H04L 12/1813;
H04L 51/32; H04N 21/2541; H04N
21/4758; H04N 21/26283
USPC .......................................................... 704/9
See application file for complete search history.

(56) References Cited

U.S. PATENT DOCUMENTS

| | | | |
|---|---|---|---|
| 9,646,007 B2* | 5/2017 | Pereira | .............. G06F 17/30038 |
| 2009/0281851 A1 | 11/2009 | Newton | |
| 2012/0179449 A1 | 7/2012 | Raskino | |
| 2013/0297694 A1 | 11/2013 | Ghosh | |
| 2013/0297702 A1 | 11/2013 | Schoen | |
| 2013/0304818 A1 | 11/2013 | Brumleve | |
| 2014/0344718 A1* | 11/2014 | Rapaport | ............ H04L 12/1813 |
| | | | 715/753 |
| 2018/0101614 A1* | 4/2018 | Kuipers | ............ G06F 17/30867 |
| 2018/0192101 A1* | 7/2018 | Bilobrov | ............ H04N 21/2541 |
| 2020/0037035 A1* | 1/2020 | Kaufman | ............ H04N 21/4758 |

OTHER PUBLICATIONS

Takahashi, Dean, "How IBM's Michelle Zhou figured out my personality from 200 tweets (interview)", venturebeat.com, Oct. 11, 2013, 24 pages.

Takahashi, Dean, "IBM researcher can decipher your personality from looking at 200 of your tweets", venturebeat.com, Oct. 8, 2013, 9 pages.

Rakshit et al., "Associating Characters to Story Topics Derived From Social Media Content", U.S. Appl. No. 15/969,174, filed May 2, 2018, 51 pages.

IBM Appendix P, list of patents and patent applications treated as related, Filed Herewith, 2 pages.

* cited by examiner

ASSOCIATING CHARACTERS TO STORY TOPICS DERIVED FROM SOCIAL MEDIA CONTENT

BACKGROUND OF THE INVENTION

The present invention relates generally to the field of data analytics, and more particularly to utilizing social media data to generate story topics and associated characters.

A vast amount of content is available on social networks and in any discussion forum (i.e., social media content) in which many new stories can be created based on the social media content. Once any user posts any new content on a social network site for other users to review, other users can post comments about the content. The submitted content can also be shared by other friends and on some occasions the content might "go viral" (i.e., become extremely popular).

SUMMARY

Embodiments of the present invention disclose a method, a computer program product, and a system for generating a story topic. The method may include one or more computer processors detecting biometric data associated with one or more users, where the one or more users are interacting with at least one social media content. The one or more computer processors collect the at least one social media content. The one or more computer processors analyze the biometric data and the at least one social media content. Based, at least in part, on the analysis of the biometric data and the at least one social media content, the one or more computer processors determine whether a popularity of the social media content meets a predetermined threshold. In response to determining the popularity of the social media content meets the predetermined threshold, the one or more computer processors extract one or more keywords and one or more concepts from the social media content. Based on the extracted one or more keywords and one or more concepts, the one or more computer processors generate one or more story topics. The one or more computer processors generate a report that includes the one or more story topics.

DETAILED DESCRIPTION

Figure 1A:
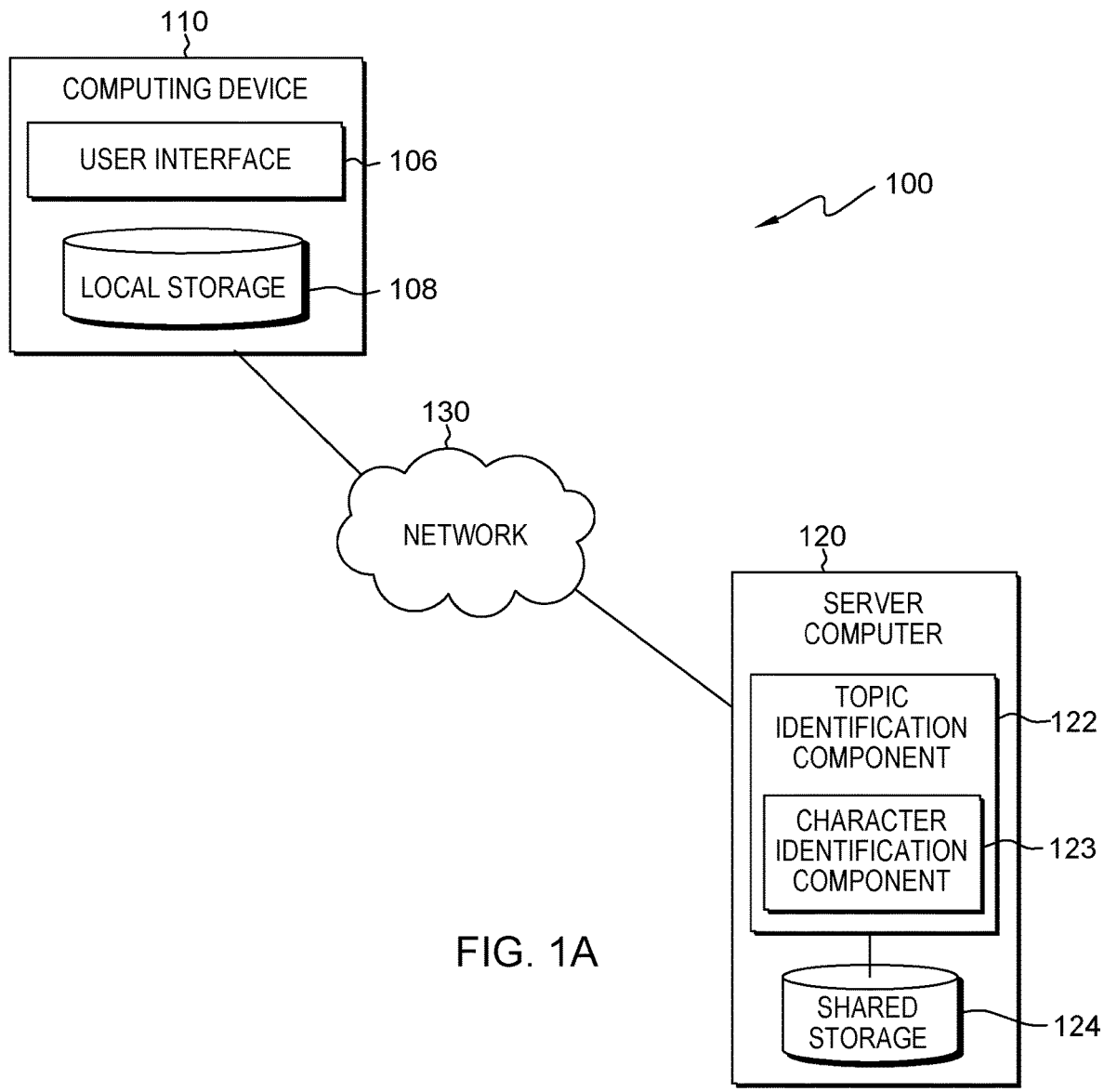
FIG. 1A is a functional block diagram illustrating a distributed data processing environment, in accordance with an embodiment of the present invention.

Trending social exchange yields large amounts of social and personal data that can be used to create story topics and predict the success of the story topics and other consumer products in the marketplace. Furthermore, vast amounts of social and personal data can link a story sequence with various characters who can play an identified role in order to establish trust and eliminate bias. Embodiments of the present invention can extract keywords, concepts, and any other form of data known in the art from social network posts and comments to create a contextual relationship among the keywords and concepts. The boundary of the story topic can be identified based on a relative position of those keywords and concepts within one or more relationship diagrams. Identified keywords and concepts within a closed boundary can be part of one or more story topics. Embodiments of the present invention can gather popularity of posts and biometric feedback from participating social media users to sequence the story topic with a contextual sense against an original post and each subsequent comment from the user and one or more other users. Furthermore, embodiments of the present invention can identify, via semantic analysis, if there are any contextual gaps in the identified story topic sequence. If one or more contextual gaps (e.g., relationship gaps) are identified, then embodiments of the present invention can invite other various social network users to contribute to fill the contextual gap. In some embodiments of the present invention, one or more cognitive robots (e.g., artificial conversational entities or chatbots) can initiate additional comments to start the discussion topic and to fill the contextual gap, thereby improving the data collection. As used herein, the terms relationship gap and contextual gap are interchangeable.

Embodiments of the present invention extract keywords and concepts from social media posts and comments to create contextual relationships among keywords and concepts; create story boundary frameworks based on a contextual relationship among the identified keywords and concepts; gather popularity and biometric feedback based on original posts and subsequent comments from participating social media users to sequence the story topic with contextual sense; identify contextual gaps in the story topic and engage participating users to fill in the contextual gaps; and predict the popularity of the story topic by generating a popularity score between various users based on user comments, user posts, user keywords, demography, uniqueness of the story topic, and threshold value; thereby improving the art of story topic pitches and prediction of movie success.

Furthermore, improvement in the art of storyline and character development comprise: identifying one or more social media content contributors who contributed one or more keywords or one or more concepts in a relationship diagram; extracting data for the one or more social media content contributors, wherein the extracted data comprises social media content posted by the one or more social media content contributors, content from the social network profile of the one or more social media content contributors, and biometric data from the one or more social media content contributors; identifying one or more story topics based on the relationship diagram; and generating a storyline and characters in the storyline based on the identified one or more story topics, wherein characters are associated with behavioral characteristics. Additionally, identification of emotional and behavioral characteristics of the character are important to make a strong story. Embodiments of the present invention address this issue by using psycholinguistics to analyze social media content, emotion data, biometric data, metadata, and generated story topics to create profiles for one or more characters in the story. Embodiments of the present invention can further identify appropriate characters and the personality of the characters.

Embodiments of the present invention focus on the creation of a psycholinguistic profile for each character in order to achieve a true representation of the character and in order to be able to determine what actions the character would take in different situations that relate to the true nature of the character. Additionally, embodiments of the present invention are not bounded by a predefined ontology, but rather are creating a dynamic graph. Furthermore, embodiments of the present invention are not limited by the bounds of an already created story but are using information from different sources to build up the character's profile and evolve the profile as the story evolves. Finally, embodiments of the present invention can automatically identify which characters are integral to the story, which characters to include, and which characters to omit.

In various embodiments, the terms friend and follower can refer to users of a social media network that follow, are enabled to follow, or are enabled access or view a user's posts, comments, user content, and user information. Additionally, the terms friend and follower can be used interchangeably herein.

It should be noted that the term contributor can refer to current users on one or more social media networks that participate in the social media content sampled, collected, identified, analyzed, and generated by the present invention. Additionally, a contributor profile can refer to the social media network profile of a contributor or a user.

In various embodiments, the term social media content can be, but is not limited to, a social media post, a social media comment, a reply to a social media comment or post, user profile data, a concept of a social media post or comment, a keyword of a social media post or comment, a reaction or expressed emotion corresponding to a social media post or comment (e.g., like, love, angry, etc.), biometric data detected in association with a social media post or comment, and any data available over the internet or via social media networks that is known in the art. Additionally, as used herein, the terms social media post and social media comment can be interchangeable with social media content.

It should be noted that a social media network can be, but is not limited to, any social media platform, message board, blog, or any website or mobile application that has user profiles and allows users to interact with one another.

FIG. 1A is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 and server computer 120, interconnected over network 130. Network 130 can be, for example, a telecommunications network, a local area network (LAN), a wide area network (WAN), such as the Internet, or a combination of the three, and can include wired, wireless, or fiber optic connections. Network 130 may also be a wireless technology for exchanging data over short and/or long distances (e.g., using short-wavelength ultra-high frequency (UHF) radio waves in the industrial, scientific and medical (ISM) band from 2.4 to 2.485 GHz from fixed and mobile devices, building personal area networks (PANs), and/or fiber optic connections). Network 130 can include one or more wired and/or wireless networks that are capable of receiving and transmitting data, voice, and/or video signals, including multimedia signals that include voice, data, and video information. In general, network 130 can be any combination of connections and protocols that will support communications between computing device 110 and server computer 120, and other computing devices (not shown in FIG. 1A) within distributed data processing environment 100.

In various embodiments, computing device 110 can be, but is not limited to, a wearable fitness device, a standalone device, a server, a laptop computer, a tablet computer, a netbook computer, a personal computer (PC), a smart phone, a desktop computer, a smart television, a smart watch, a smart speaker, any biometric recording device known in the art, any internet of things (JOT) device and/or health monitoring device, a radio, stereo system, or any programmable electronic computing device capable of communicating with various components and devices within distributed data processing environment 100, via network 130 and any combination thereof. In general, computing device 110 represents any programmable mobile device or a combination of programmable mobile devices capable of executing machine-readable program instructions and communicating with users of other mobile devices (not shown) via network 130 and capable of executing machine-readable program instructions and communicating with server computer 120. In some embodiments, computing device 110 can comprise one or more speakers and one or more microphones that can play, monitor, transmit, and record sound.

In other embodiments, computing device 110 can represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Additionally, computing device 110 can be, but is not limited to, any IOT wearable device that can detect, measure, log, record, and aggregate a user's biometric data, via biometric sensors or biometric scanners on computing device 110 (not shown). Biometric data can be, but is not limited to, blood pressure, heart rate, respiratory rate, calories burned, calories consumed, pulse, oxygen levels, blood oxygen level, glucose level, blood pH level, salinity of user perspiration, skin temperature, galvanic skin response, electrocardiography (ECG or EKG) data, body temperature, eye tracking data, and any bodily measurements or calculations known in the art. In various embodiments, computing device 110 includes a camera. In various embodiments, computing device 110 includes a microphone. In the depicted embodiment, computing device 110 includes user interface 106 and local storage 108. In various embodiments, computing device 110 can represent more than one device.

User interface (UI) 106 provides an interface for the user of computing device 110 to access social media networks and internet websites and interact with other users on social media networks and internet websites. In some embodiments, UI 106 can provide an interface to topic identification component (TIC) 122 on server computer 120 for a user of computing device 110. For example, if the user of computing device 110 is a story writer, TIC 122 can output story topics, characters, story topic popularity scores, relationship diagrams, and psycholinguistic profiles such that the story writer can use the data to write a story. In one embodiment, UI 106 can be a graphical user interface (GUI) or a web user interface (WUI) and can display text, documents, videos, films, movies, images, web browser windows, user options, application interfaces, and instructions for operation, and include the information (such as graphic, text, and sound) that a program presents to a user and the control sequences the user employs to control the program. In another embodiment, UI 106 can also be mobile application software that provides an interface between a user of computing device 110 and server computer 120. In an example, mobile application software, or an "app," is a computer program designed to run on smart phones, tablet computers and other mobile devices. In an embodiment, UI 106 enables the user of computing device 110 to send data, input data, edit data, receive data, and post data and information on one or more social media networks (i.e., post and generate social media content, comment on and reply to social media content, and correct social media content).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any other programmable electronic device capable of communicating with computing device 110 and other computing devices (not shown) within distributed data processing environment 100 via network 130. In another embodiment, server computer 120 represents a computing system utilizing clustered computers and components (e.g., database server computers, application server computers, etc.) that act as a single pool of seamless resources when accessed within distributed data processing environment 100. In the depicted embodiment, server computer 120 includes TIC 122 and shared storage 124. Server computer 120 can include internal and external hardware components, as depicted and described in further detail with respect to FIG. 5.

Shared storage 124 and local storage 108 can each be a data repository or a database that can be written to and read by one or a combination of TIC 122, server computer 120, and computing device 110. In the depicted embodiment, shared storage 124 resides on server computer 120 and local storage 108 resides on computing device 110. In another embodiment, shared storage 124 and local storage 108 can reside elsewhere within distributed data processing environment 100 provided TIC 122 has access to shared storage 124 and local storage 108. A database is an organized collection of data. Shared storage 124 and local storage 108 can be implemented with any type of storage device capable of storing data and configuration files that can be accessed and utilized by TIC 122, such as a database server, a hard disk drive, or a flash memory. In other embodiments, shared storage 124 and local storage 108 can each be a hard drive, a memory card, a computer output to laser disc (cold storage), or any form of data storage known in the art. In various embodiments, TIC 122 can store and retrieve data from shared storage 124 and local storage 108. For example, TIC 122 stores social media content and biometric data from the generated social media content and from a biometric sensor (e.g., computing device 110) to shared storage 124 to be retrieved later and used as a reference or as elements of analysis. In various embodiments, the stored data that is later retrieved can be referred to as historic data.

As referred to herein, all data retrieved, collected, and used, with regards to a user, is used in an opt in manner, i.e., the user has given permission for the data to be used. Any data or information used for which the user has not opted in is data that is publicly available.

In various embodiments, TIC 122 can connect, sync, and pair to computing device 110. In various embodiments, TIC 122 can communicate with or enable communication between one or more social media networks and computing device 110 and receive, retrieve, collect, record, store, and send user data, metadata, biometric data, social media content, or any other data known in the art to and from one or more social media networks and computing device 110. In an example where computing device 110 is a smart watch, TIC 122 can enable computing device 110 and a social media network to communicate with each other, wherein the social media network can notify computing device 110 that the user is interacting with the social media network, and computing device 110 can monitor the user's biometric responses to the associated social media content. TIC 122 can then collect the information from computing device 110 and the social media network. In another example, once computing device 110 registers a change in the user's biometric data, computing device 110 can send a request to the social media network to determine if the user is interacting with the social media network and begin monitoring, collecting, and recording the biometric data associated with the social media content with which the user is interacting. TIC 122 can monitor keywords of the user's posts and comments from computing device 110 while the user is posting or commenting on one or more social media networks.

In various embodiments, TIC 122 can detect and measure one or more users' emotions, the users' own social media content, information about the users and associated content, and biometric data, while the one or more users are reading or interacting with social media content. In an embodiment where computing device 110 includes one or more biometric sensors (not shown) and a camera (not shown), TIC 122 can receive and record a user's pulse, heart rate, blood pressure, etc., from the biometric sensors in addition to the user's eye pupil dilation, facial expressions, and body language from the camera while the user watches and comments on a video. In an embodiment where computing device 110 includes a speaker (not shown) and a microphone (not shown), TIC 122 can monitor, record, identify, and transmit one or more users' vocal pattern, jitter (e.g., pitch perturbation), shimmer (e.g., amplitude perturbation), harmonics-to-noise ratio, or any vocal or other sound measurements known in the art from computing device 110. In various embodiments, the aforementioned sound and vocal data can be construed as biometric data. In an embodiment where computing device 110 includes a global positioning system (GPS), TIC 122 can monitor a user's location. Information about the user and associated content, or metadata, can be, but is not limited to, user name, a date, a date the data was created, a date the data was modified, a user location, a location where social media content was created, keywords and concepts of social media content, emoticons, and geolocation. In some embodiments, TIC 122 can monitor, identify, and record sound from videos, user conversations, and user reaction to social media content, and categorize the recorded sound as user biometric data associated with the social media content.

In various embodiments, TIC 122 can gather and analyze social media content, biometric data, metadata, and emotion data to determine a value of popularity, which is based on how many people have commented on or liked the social media content. In various embodiments, TIC 122, via content analysis or semantic analysis, can determine if the social media content popularity meets the one or more predetermined threshold values, and can accordingly extract the keywords and concepts that satisfy the one or more predetermined threshold values based on the content analysis or semantic analysis of the social media content, biometric data, metadata, and emotion data. In other embodiments, TIC 122 can identify, collect, extract, analyze, determine, and create relationships between the identified keywords and concepts and the biometric data, metadata, and emotion data from the identified social media content of the identified users. In various embodiments, TIC 122 can use both predetermined criteria and predetermined search criteria. In some embodiments, TIC 122 can create a relationship diagram among the keywords and concepts extracted from social media content.

Furthermore, in some embodiments, via a contextual analysis engine included in TIC 122 (not shown), TIC 122 can extract emotion information, keywords, concepts, metadata, and emotion data from social media content, which can be shown with or on the relationship diagram. In various embodiments, TIC 122 can calculate the relationship bond strength between one or more pairs of concepts and keywords based on how the concepts are semantically bonded. In various embodiments, TIC 122 can identify the concepts present in the border of the diagram, from which TIC 122 can create a story boundary framework based on the identified concepts present in the border of the diagram and an identified associated emotion. In various embodiments, TIC 122 identifies the associated emotion based on the extracted emotion data, keywords, concepts, biometric data, and metadata from social media content. In various embodiments, using a relationship diagram, TIC 122 can identify which concepts a story writer can present in the story.

Additionally, TIC 122 can identify the relative position of each concept in the entire diagram, so a writer can sequence the story topic based on relationships and relative position of the concept in the diagram. In some embodiments, TIC 122 can sequence the story topic based on relationships and relative position of the concept in the diagram automatically through cognitive computing, content analysis, or semantic analysis. In various embodiments, TIC 122 can determine if there are relationship gaps in the story boundary framework by determining if there are gaps between the identified concepts, if the concepts are compatible, or if there is open ended content inside the boundary of the diagram, via semantic or content analysis. For example, TIC 122 analyzes a social media post stating "tarantulas are terrifying (panic face emoticon)" and determines there is a relationship gap between keywords "tarantulas" and "terrifying" and the concept of "terrifying tarantulas" because there is no contextual basis as to why the keywords are related and how they enhance the concept.

In various embodiments, if TIC 122 determines there are one or more relationship gaps between one or more keywords or one or more concepts, then TIC 122 either notifies the user to start a dialog or generates social media content (e.g., one or more social media posts) to fill in the relationship gaps. In the embodiment, TIC 122 generates social media posts to engage one or more users in conversation. For example, to fill the relationship gap between keywords "tarantulas" and "terrifying," from the example above, TIC 122 can query the story writer for instructions, and TIC 122 can receive input instructing TIC 122 to generate social media posts and comments asking the social media network users to comment or post why they think tarantulas are terrifying. In other embodiments, TIC 122 posts comments on a video post and tags the users TIC 122 has identified or from whom TIC 122 is collecting data. In some embodiments, TIC 122 can tailor the generated social media conversation to a particular person or group of people of interest (e.g., contributors). In other embodiments, TIC 122 can fill one or more relationship gaps automatically, without user input. For example, TIC 122 can fill an identified relationship gap based on internet history, past internet searches, historic biometric data, historic relationship diagrams, or historic social media content. In various embodiments, TIC 122 can retrieve historic data from shared storage 124 or local storage 108.

In various embodiments, user feedback from one or more users can contribute to filling the relationship gap. In one embodiment, TIC 122 can collect and analyze user conversations via comments, posts, and emotional responses on social media pertaining to keywords and concepts to fill relationship gaps. For example, TIC 122 can extract keywords and concepts such as heartfelt, genius, motivational, family, support, persistence, obstacle, overcome, coach, routine, and scholarship from posts and comments by users pertaining to a local news story about an athlete overcoming injury to earn a division one scholarship. In various embodiments, TIC 122 can extract the biometric data, social media content, metadata, and contributor profile information for analysis by a social network server (not shown) to find the popularity of the story boundary framework. For example, TIC 122 can collect, extract, and analyze the emotional reactions (e.g., happy, sad, love, angry) and biometric data reactions (e.g., heart rate, blood pressure, pupil dilation, etc.) to posts or comments by various users, and the number of likes and shares of the social media content associated the identified keywords and content. Based on the analysis, TIC 122 can determine if the story boundary framework is popular or likeable based on a predetermined threshold value of popularity. For example, the predetermined threshold value of popularity may be a minimum number of likes or shares, or a combination, such as at least 1000 likes and shares combined. In another example, the predetermined threshold value of popularity may be a minimum number of positive comments, which TIC 122 determines to be positive by using one or more natural language processing techniques. In various embodiments, TIC 122 can juxtapose the story boundary framework (or any part of the story boundary framework, such as metadata, profile, social media content, feedback, or biometric data) to one or more users. A contributor's profile data can be, but is not limited to, the contributor's interests, preferences, or likes in movies, films, actors, actresses, toys, board games, video games, software, companies, music, artists, books, authors, cars, brands, clothes, shoes, animals, pets, food, locations, airlines, or anything known in the art as being likable. In various embodiments, TIC 122 can output a story topic popularity score of the generated story boundary framework based on the analysis of the one or more contributors' metadata, profile, social media content, feedback, and biometric data.

In the depicted embodiment, character identification component (CIC) 123 is a standalone program. In another embodiment, CIC 123 may be fully integrated into TIC 122. In various embodiments, CIC 123 can create one or more psycholinguistic profiles for one or more characters based on the keywords and concepts from the social media content or from one or more generated story boundary frameworks. For example, if two keywords are law and justice, then CIC 123 identifies a character that maintains laws and justice. In various embodiments, a psycholinguistic profile can encompass attributes such as personality traits, needs, values, and social behavior. In various embodiments, a psycholinguistic profile can comprise percentages, numerical breakdowns, or any value system known in the art of one or more character traits, such as: agreeableness, modesty, cooperation, sympathy, morality, trust, altruism, conscientiousness, dutifulness, self-discipline, self-efficacy, achievement striving, cautiousness, orderliness, openness, adventurousness, intellect, artistic interest, imagination, emotionality, extraversion, friendly, gregariousness, activity level, assertiveness, excitement seeking, cheerfulness, immoderation, vulnerability, anxiety, anger, self-consciousness, self-expression, closeness, harmony, curiosity, excitement, ideal, conservation, self-enhance, hedonism, self-transcendence, openness to change, and social content interaction behavior.

In various embodiments, CIC 123 can determine character and personality traits for one or more contributors by accessing the one or more contributors' social media profiles, social media content, metadata, or biometric data and aggregating the information and creating a psycholinguistic profile for each contributor. For example, CIC 123 can access a contributor's social media profile, which is publicly available, and collect the contributor's likes, interests, hobbies, public photos, trips, destinations, and any information available on the contributor's social media profile and aggregate the contributor's past social media content for contextual analysis and creation of the psycholinguistic profile.

In various embodiments, CIC 123 can identify a behavioral characteristic of one or more story characters based on one or more extracted characteristics from the psycholinguistic profiles of one or more contributors, in which CIC 123 can correlate one or more story characters with one or more known personalities and display them to the one or more contributors. In various embodiments, CIC 123 can link the psycholinguistic profiles of one or more contributors to the relationship diagram based on the extracted keywords and concepts from social media content associated with the contributors. This linkage of psycholinguistic profile with keywords and concepts can help explain or identify who should play what role in the story boundary framework. In various embodiments, CIC 123 performs contextual analysis of the social media content to find additional characters to add to the identified story boundary framework. Additionally, in various embodiments, CIC 123 identifies the contextual importance of the identified character in the story. In some embodiments, CIC 123 creates basic structures of one or more characters based on one or more text documents (e.g., a movie script) and psycholinguistic profiles based on contributor social media profiles, in which CIC 123 can map the identified characters of the story topic to the appropriate script or lines of the story, via a contextual analysis engine. Additionally, CIC 123 can review, analyze, and identify a character from a script about a story topic, extract keywords and concepts, and map the keywords and concepts to identified characters. For example, CIC 123 extracts the keywords and concepts from a script about a "Dinosaur Petting Zoo," and identifies and maps the scientific interest (using contextual analysis, as will be described with respect to FIG. 2) and in-depth knowledge of the dinosaurs to the Dinosaur Zoologist. In another example, CIC 123 identifies the characteristics of the Dinosaur Zoologist and maps the Dinosaur Zoologist to the scientific knowledge and in-depth understanding of the dinosaurs to the appropriate lines in a script.

In various embodiments, CIC 123 analyzes the relationship diagram and accordingly the extracted keywords and concepts. In some embodiments, CIC 123 determines which character performs a certain activity. In other embodiments, CIC 123 determines which one or more concepts and one or more keywords are associated with an activity or associated with a character. For example, CIC 123 may determine the act of flying through the air is associated with a superhero character.

In various embodiments, CIC 123 identifies the contributors who generated the concepts with which the characters are associated. CIC 123 can further identify one or more social media contributors to associate with psycholinguistic profiles, from which CIC 123 can tag the associated characters with identified personalities accordingly. In some embodiments, CIC 123 displays the story boundary framework, psycholinguistic profiles, associated characters, social media content, and user profiles in such a manner that one or more story writers can visually understand how the characters can be performed and how the characters' personalities will be presented. In various embodiments, CIC 123 can add characters to the concept and keyword relationship diagram, in which characters can be associated with the structure of the story boundary framework.

Figure 1B:
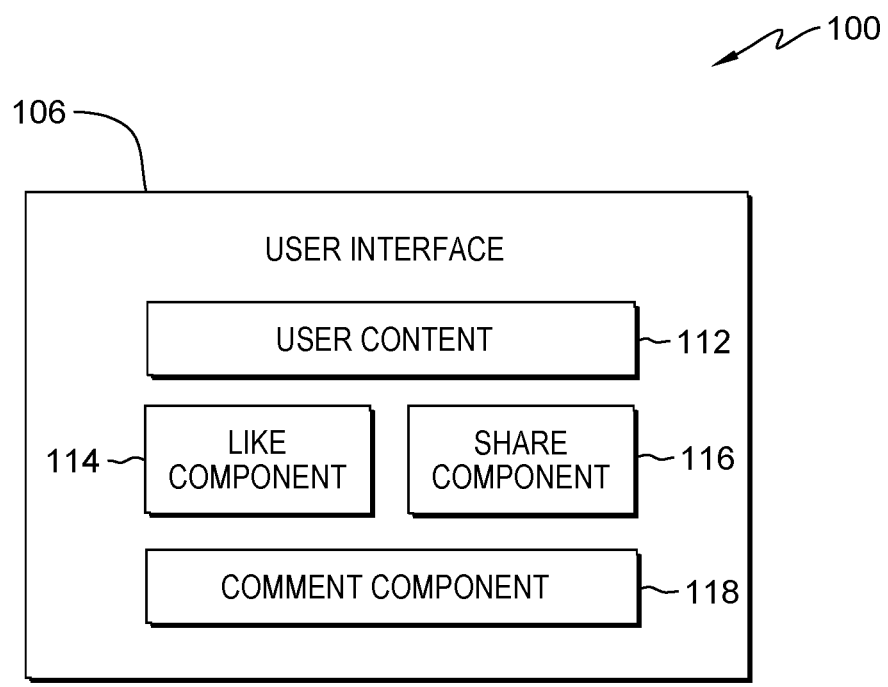
FIG. 1B is a functional block diagram illustrating a user interface within the distributed data processing environment, in accordance with an embodiment of the present invention.

FIG. 1B is a functional block diagram illustrating user interface 106, on computing device 110 within distributed data processing environment 100 of FIG. 1A, in accordance with an embodiment of the present invention. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, UI 106 includes user content 112, like component 114, share component 116, and comment component 118. In various embodiments, user content 112 can enable a user to input social media content onto a social media network or the internet. In some embodiments, user content 112 can be a child window, in which a user can post one or more social media contents for their friends or followers to view. For example, a social media post by User 1 may read: "Dinosaurs are really scary, but I would love to be able to see a live one at the zoo! There is something that is just so intriguing about dinosaur behavior. It would be a dream come true to just observe and learn their behavior . . . . Being able to pet one would be magical in its own right! Haha!" In another embodiment, a user can post a picture of the ocean and an associated geo-tag (i.e., location), or a movie review on one or more social media networks. In various embodiments, user content 112 can be associated with like component 114 and share component 116. In some embodiments, user content 112 can enable a user to display an emotional expression with the social media content post. In various embodiments, one or more users can like, reply, comment, and express emotion to other comments, replies, and any other social media content, including their own, known in the art.

In various embodiments, like component 114 can enable one or more users to like posted social media content. In various embodiments, share component 116 can enable one or more users to share posted social media content. In various embodiments, like component 114 can indicate how many people "liked" the social media content and share component 116 can indicate how many people shared the social media content by displaying a numeric value corresponding to the number of likes, shares, comments, or emotional responses. In some embodiments, like component 114 can enable one or more users to express emotion towards posted social media content. For example, enabling a user to label or state that the social media content makes them sad, happy, angry, surprised, excited, happy, laugh, loved, or any expression of emotion known in the art. In various embodiments, share component 116 enables one or more users (e.g., a user's followers and friends) to share social media content with followers and friends of other users, and any other user on the social media network.

In various embodiments, comment component 118 enables social network users to interact, converse, and comment on social media content. For example, referencing the user content example discussed above, the following are examples of responses received by comment component 118:

User 2 (replying to User 1): "You are absolutely right, even though I find velociraptors terrifying I would love to be able to pet one or even see one interact in the wild. If an interactive live dinosaur petting zoo existed it would educate so many people and show everyone that most dinosaurs are just peaceful giants."

User 1: "That's an awesome idea! Hey . . . . Imagine how great it would be if you could own a dinosaur!! . . . an herbivore obviously (laugh out loud emoticon)"

User 2: "That would be pretty awesome! I would like to own a small carnivore, it probably can't be too much different than owning a snake. (smiley face emoticon)"

User 1: "NO WAY!! Are you serious!? Most domestic snakes don't have teeth and you can't just keep it in a tank. (anxious face emoticon)"

User 2: "Yeah, you're right. I guess I'll have to see them at the zoo (wink face emoticon)."

User 1: "You mean tropical dinosaur petting zoo hahaha!"

In various embodiments, TIC 122 can extract keywords and content from the comments and replies on user content 112 and comment component 118. In the example, TIC 122 can extract keywords and concepts from the post for analysis. For example, TIC 122 extracts "dinosaurs," "zoo," "scary," "observe," "magical." "pet," "dinosaur behavior," "love," and "dream" from the social media post example above. In various embodiments, TIC 122 identifies keywords and concepts via one or more predetermined parameters. In some embodiments, TIC 122 can extract metadata or biometric signals from social media content. For example, exclamation points and capital letters can convey excitement or anger. In various embodiments, emotional expression (e.g., wink face, smiley face, anger, etc.) can be expressed via emoticons and emojis. In various embodiments, TIC 122 can extract keywords, concepts, biometric signals, metadata, emotions, and user profile data from social media content and analyze the extracted data to create a concept relationship between the extracted data, via content analysis or semantic analysis, as will be described with respect to FIG. 2.

Figure 2:
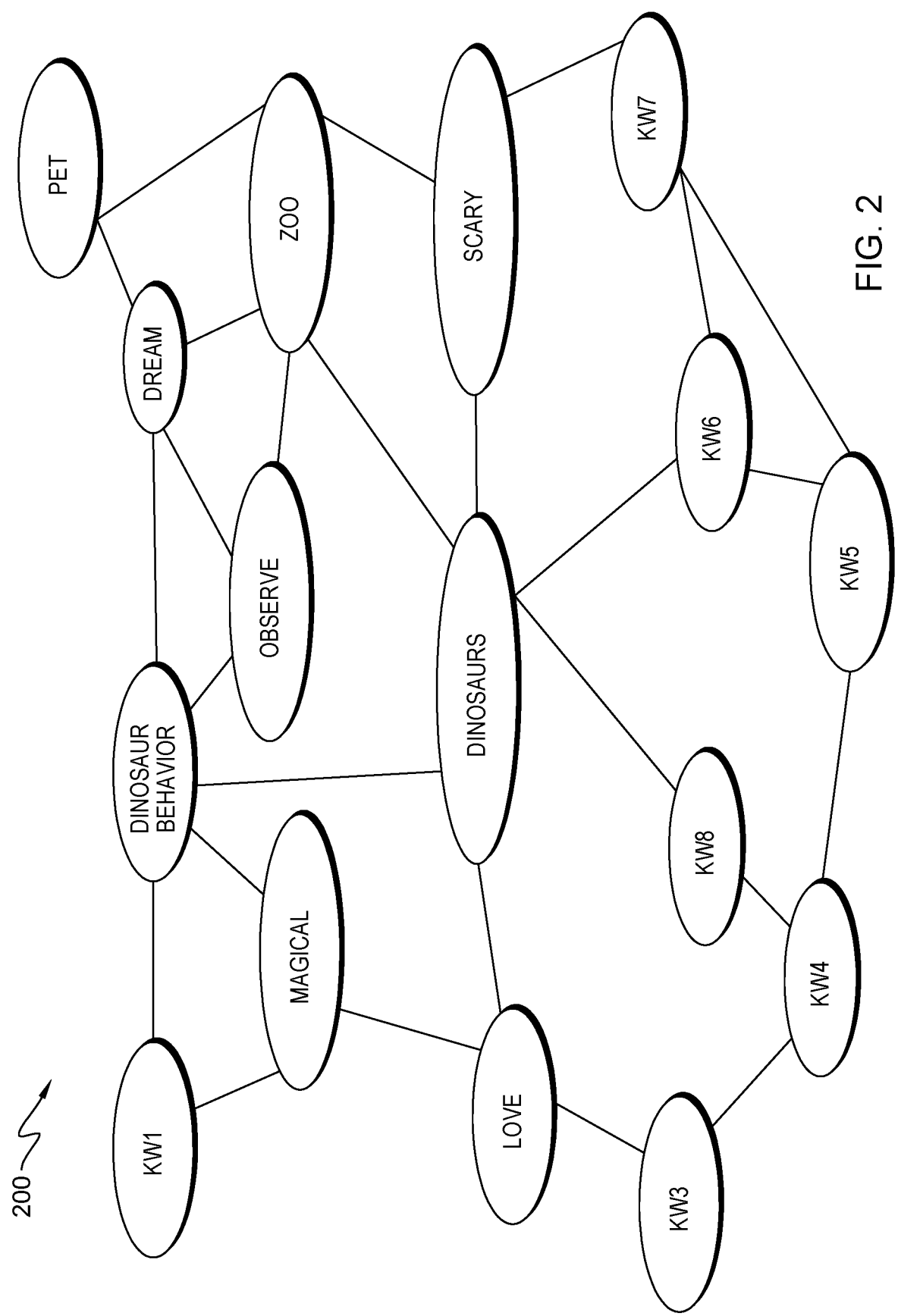
FIG. 2 is a relationship diagram depicting semantic analysis of social network posts, associated social network comments, and associated social media content, in accordance with an embodiment of the present invention.

FIG. 2 is relationship diagram 200 depicting semantic analysis of social network posts, associated social network comments, and associated social media content in accordance with an embodiment of the present invention. FIG. 2 provides only an illustration of one implementation and does not imply any limitations with regard to the environments in which different embodiments may be implemented. In various embodiments, TIC 122 can generate a relationship diagram, as depicted in FIG. 2, to enable identification of story concepts. In this particular embodiment, TIC 122 can extract predetermined or predefined keywords and concepts, emotion data, metadata, and biometric data from a user's posted social media content, social media profile, and a biometric sensor associated with the user (e.g., computing device 110).

In the embodiment, TIC 122 can identify, collect, extract, analyze, determine, and create relationships between the identified keywords, concepts, biometric data, metadata, and emotion data from the identified social media content from the identified users that fit predetermined search criteria or a predetermined threshold, as shown in FIG. 2. In this example, TIC 122 extracts the predetermined keywords and concepts from an identified social media post and comments to generate a concept relationship between the extracted data, via semantic analysis. For example, if a screenwriter wants to create a family film, the screenwriter can enable TIC 122 to identify family friendly topics on one or more social media networks by inputting predetermined family friendly related search terms into TIC 122 such as, but not limited to, son, daughter, husband, wife, family, smile, laugh, heartfelt, inspiring, animal, love, happy, sports, and any positive emotional response to social media content. Furthermore, the screenwriter can narrow the search by inputting predetermined trending data and demographic information into TIC 122 such as, but not limited to, number of shares, number of comments, number of likes, geographical region, number of children, etc.

In the depicted embodiment, FIG. 2 illustrates semantic analysis and creation of a relationship diagram using the social media content conversation example referenced above. The initial social media post, from the example above, states "Dinosaurs are really scary, but I would love to be able to see a live one at the zoo! There is something that is just so intriguing about dinosaur behavior. It would be a dream come true to just observe and learn their behavior . . . . Being able to pet one would be magical in its own right! Haha!" In this example, each comment is accompanied by a subsequent comment or reply to a comment pertaining to the primary concept and similar concepts (i.e., dinosaurs, zoo, etc.). As shown above, User 1 and User 2 reply to each other's comments.

In this example, each reply or comment contains concepts related to the main concept. For example, as shown above, User 1 generates an initial post comprising dinosaurs, scary, magical, dinosaur behavior, zoo, pet, love, and observe as the keywords and concepts. Subsequent to the initial social media post, User 2 comments on the initial post stating "You are absolutely right, even though I find velociraptors terrifying I would love to be able to pet one or even see one interact in the wild. If an interactive live dinosaur petting zoo existed, it would educate so many people and show everyone that most dinosaurs are just peaceful giants." In the example, TIC 122 can identify and extract the related keywords and concepts via semantic analysis, which in this case comprises: velociraptor, terrifying, love, pet, zoo, petting zoo, educate, dinosaurs, and peaceful giants. Using semantic analysis, TIC 122 can sequence the story topic based on the relationships, i.e., the relative position of the keywords and concepts in the relationship diagram. In the embodiment, TIC 122 can associate each keyword and concept with the keywords and concepts of the initial social media post. For example, tagging terrifying on bubble keyword 7 (KW7) because terrifying is related to scary, velociraptor on bubble KW6 because velociraptor is related to dinosaur and terrifying, etc., as shown in FIG. 2. TIC 122 identifies the boundary of the story topic based on the relative position of the keywords and concepts. Identified keywords and concepts within a closed boundary are part of one story topic. The keywords and concepts in the border of the relationship diagram indicate the story boundary framework.

Figure 3:
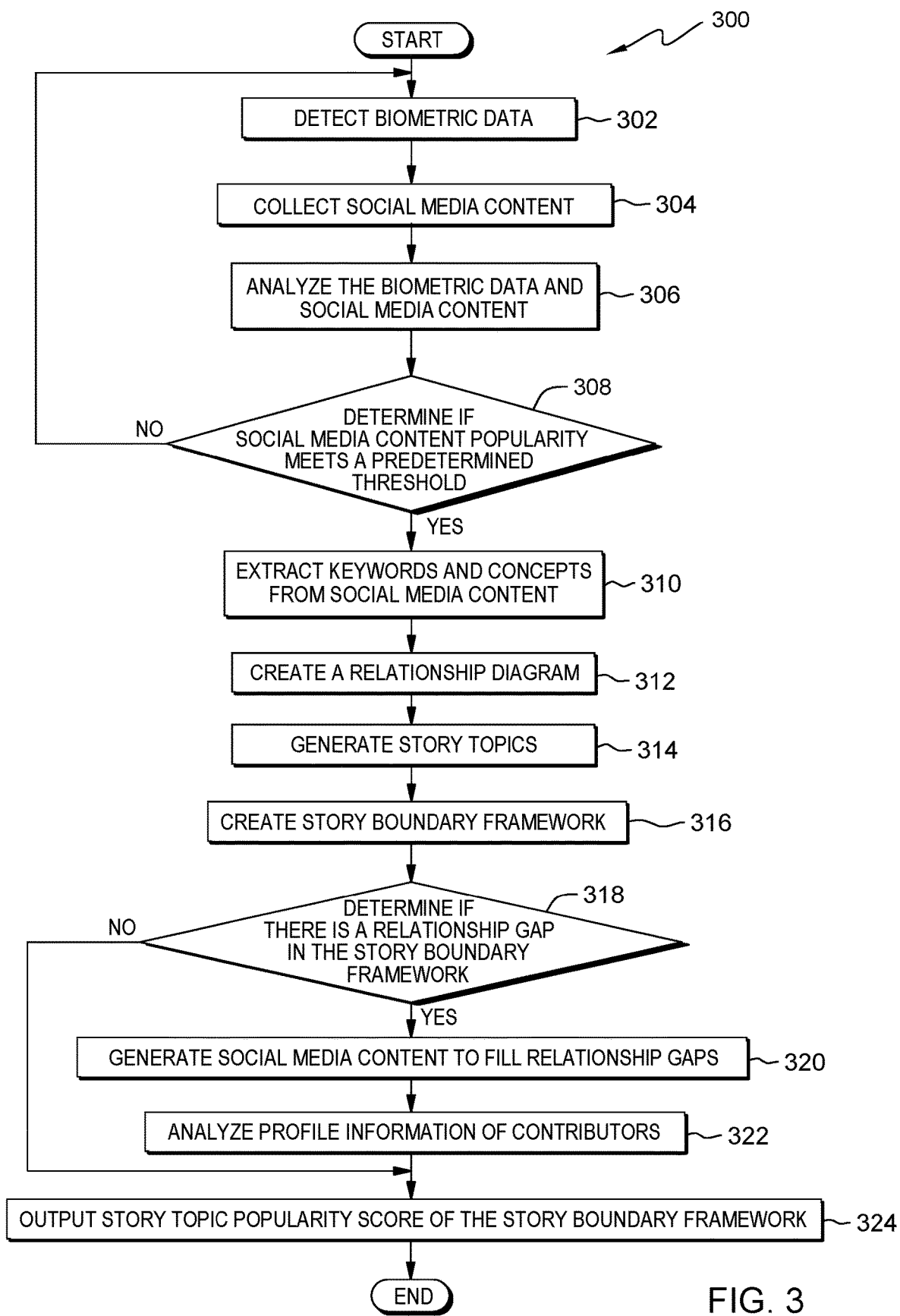
FIG. 3 is a flowchart depicting operational steps of a topic identification component, on a server computer within the distributed data processing environment of FIG. 1, for generating story boundary frameworks, in accordance with an embodiment of the present invention.

FIG. 3 is a flowchart depicting operational steps of TIC 122, generally designated 300, on server computer 120 within distributed data processing environment 100 of FIG. 1, for generating story boundary frameworks, in accordance with an embodiment of the present invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

In step 302, TIC 122 detects biometric data. In various embodiments, TIC 122 can detect biometric data from computing device 110 while a user is interacting with social media content on one or more social media networks. For example, TIC 122 can detect and record a user's heart rate, pulse, and blood pressure from a biometric sensor in computing device 110, such as if computing device 110 is a smart watch and a user's eye pupil dilation and body language, via a camera included in computing device 110, as the user reads or writes a comment. In another example, where computing device 110 is a smart watch paired with a smart phone, when the user is reading, writing, or watching any social media content, TIC 122 can enable computing device 110 to detect the emotion of the user. In some embodiments, TIC 122 can compile and associate the detected emotion and biometric data with metadata of the social media content and metadata of one or more social networks. In another example, where computing device 110 is a laptop, an installed camera can gather a user's facial expression and body language while interacting with social media content on the laptop.

In step 304, TIC 122 collects social media content. In various embodiments, TIC 122 can collect the social media content associated with the detected biometric data. For example, TIC 122 may collect a video of a protest the user shared, at a time at which the user's heart rate increased, the user's eyes dilated, and the user posted, with regards to the video, "This is the most heartfelt video I have ever seen." In various embodiments, TIC 122 can consistently collect social media content and the user's biometric data.

In step 306, TIC 122 analyzes the biometric data and social media content. In various embodiments, TIC 122 analyzes biometric data and social media content, via content analysis or semantic analysis, to calculate a social media content popularity score, which can be based on how many people have responded to, i.e., commented, posted, shared, or liked, the social media content. In an embodiment, a response to the social media content may also be determined via detected biometric data, such as an increased heart rate. For example, if an image comprises thousands of responses, detected via natural language processing (NLP) of the responses, and invokes a consistent emotion from the thousands of users, detected via biometric data, then the image would have a corresponding high social media content popularity score. In an embodiment, TIC 122 analyzes metadata associated with the biometric data. In a further embodiment, TIC 122 analyzes metadata associated with the social media content. For example, TIC 122 may analyze a user's name, age, or location associated with the biometric data or the social media content.

In step 308, TIC 122 determines if the social media content popularity score meets a predetermined threshold. In various embodiments, TIC 122 determines whether the analyzed social media content and biometric data meets a predetermined threshold. In some embodiments, via a contextual analysis engine, TIC 122 can identify which social media content associated with one or more users meets the one or more required predetermined threshold value. In an embodiment, if TIC 122 determines that the collected social media content and biometric data does not meet the one or more predetermined thresholds ("no" branch, step 308), then TIC 122 returns to step 302. However, in another embodiment, if TIC 122 determines that the collected social media content and biometric data meet the one or more predetermined thresholds ("yes" branch, step 308), then TIC 122 advances to step 310. For example, if TIC 122 determines a social media content has 1000 likes, and the predetermined threshold is 750 likes, then TIC 122 determines that the social media content meets the threshold.

In step 310, TIC 122 extracts keywords and concepts from social media content. In various embodiments, TIC 122 can extract one or more keywords, concepts, emotions, and data from collected social media content, metadata, and biometric data that meet one or more predetermined threshold values based on semantic and content analysis of the social media content. For example, a film maker desiring to make an uplifting and inspirational film can utilize TIC 122 to extract variations and synonyms of the words inspire, heartfelt, love, justice, pride, history, and culture. In addition, TIC 122 can extract recorded body language and expressed emotions (love, sad, and excitement) from collected social media content and associated biometric data. In various embodiments, TIC 122 can determine one or more concepts based on the extracted keywords. For example, a social media post reads: "Dinosaurs are really scary, but I would love to be able to see a live one at the zoo! There is something that is just so intriguing about dinosaur behavior. It would be a dream come true to just observe and learn their behavior . . . being able to pet one would be magical in its own right! Haha." In the example, TIC 122 can extract keywords such as "dinosaurs," "scary," "magical," "behavior," "zoo," "pet," "love," and "observe."

In step 312, TIC 122 creates a relationship diagram. In various embodiments, TIC 122 can create one or more relationship diagrams, via semantic analysis, based on the extracted one or more keywords, one or more concepts, one or more emotions, data from collected social media content, metadata, and biometric data, as seen in FIG. 2. In some embodiments, TIC 122 can create a relationship diagram among the one or more extracted concepts. In the embodiment, TIC 122 extracts predetermined keywords and concepts, emotion data, metadata, and biometric data from a user's posted social media content, social media profile, and biometric sensor (i.e., computing device 110).

In step 314, TIC 122 generates story topics. In various embodiments, TIC 122 can dynamically generate or create one or more story topics or story concepts based on information (e.g., keywords, concepts, and biometric data) on the relationship diagram. Continuing the dinosaur example above, TIC 122 extracts keywords and concepts from the post for analysis. For example, extracting "dinosaurs," "scary," "magical," "behavior," "zoo," "pet," "love," and "observe" from the social media post example above, TIC 122 can use the relationship between the extracted keywords to determine that one of the topics is a "dinosaur petting zoo." In one embodiment, TIC 122 automatically generates a report that includes the generated story topics and transmits the report to the user, via user interface 106. In another embodiment, the report may include the relationship diagram.

In step 316, TIC 122 creates a story boundary framework. In various embodiments, TIC 122 creates one or more story boundary frameworks based on the contextual relationship among the identified keywords and concepts. As used herein, the terms story framework and story topic boundary are interchangeable with the term story boundary framework. TIC 122 identifies the boundary of the story topic based on a relative position of those keywords and concepts within the relationship diagram. In various embodiments, TIC 122 can identify the concepts present in the border of the relationship diagram, from which TIC 122 can create a story boundary framework based on the identified concepts present in the border of the diagram. Continuing the example above, while a story topic is "dinosaur petting zoo," the story boundary framework may include other topics or concepts, such as a "scary" situation occurring at a dinosaur petting zoo, since the keyword "scary" is in the border of the relationship diagram shown in FIG. 2. TIC 122 gathers popularity data and biometric feedback based on original posts and subsequent comments from participating social network users to sequence the story topic with contextual sense. In some embodiments, TIC 122 can identify story boundaries by constructing feature vectors of lexical or acoustic features for one or more of social media content, biometric data, and metadata as a unit of analysis. In the embodiment, TIC 122 can use these feature vectors to train decision tree classifiers specific to one or more data sources (e.g., social media content, biometric data, etc.). For example, TIC 122 can create a unique model for social media networks, social media content, biometric data, etc., to identify one or more story boundary frameworks.

In other embodiments, TIC 122 can create a universal model for identifying one or story boundary frameworks. In various embodiments, to capture lexical cues to story boundaries, TIC 122 can extract predetermined segments and predetermined coefficients based on predetermined window sizes of segments preceding and following a predetermined boundary. In various embodiments, TIC 122 can compute story boundaries based on lexical consistency immediately or following other related or associated story boundary frameworks from those lexical items, for each data source. In one embodiment, TIC 122 automatically generates a report that includes the story boundary framework and transmits the report to the user, via user interface 106.

In step 318, TIC 122 determines if there is a relationship gap in the story boundary framework. In various embodiments, TIC 122 determines, via semantic or content analysis, if there are one or more relationship gaps in the story boundary framework by identifying gaps between the identified keywords and concepts, and either determining if the keywords and concepts are compatible or determining if there is open ended content inside the boundary of the diagram. For example, using the dinosaur example above, TIC 122 determines there is relationship gap between the keywords "velociraptor" and "terrifying" and the concept of "terrifying velociraptors" because there is no contextual basis between the two keywords or any explanation as to why "velociraptors" are "terrifying." Generally, there is no textual support that explains why the user finds "velociraptors terrifying." In the embodiment, if TIC 122 determines there are no gaps in the story boundary framework ("no" branch, step 318), then TIC 122 advances to step 322. However, in the embodiment, if TIC 122 determines there are one or more gaps in the story boundary framework ("yes" branch, step 318), then TIC 122 advances to step 320.

In step 320, TIC 122 generates social media content to fill in relationship gaps. In various embodiments, TIC 122 generates posts and comments, via an artificial conversational entity (e.g., a chatbot), to encourage conversations between users about a particular topic in order to fill relationship gaps in one or more story boundary frameworks. For example, in an effort to fill the relationship gap between the concept of "terrifying velociraptors" from the dinosaur example above, a user can instruct TIC 122 to reply to the User 2 comment and ask, "why do you find velociraptors terrifying?" In other embodiments, TIC 122 can automatically initiate a conversation with users regarding a specific topic.

In another example, TIC 122 generates a series of posts about a superhero sidekick in order to gauge user interest for a spin off movie for the superhero sidekick. In the example, TIC 122 uses user comments, shares, likes, biometric data, metadata, emotional reaction, conversations, fan theories, ideas, fiction, keywords, and concepts from social media content to generate keywords or concepts to fill the relationship gaps in the story boundary framework. In one embodiment, TIC 122 updates the relationship diagram to include the information generated to fill the relationship gaps.

In step 322, TIC 122 analyzes profile information of contributors. In various embodiments, TIC 122 analyzes the profile information of one or more contributors of collected social media content or biometric data associated with story topics that meet one or more predetermined thresholds, which can be used to calculate a story topic popularity score.

In step 324, TIC 122 outputs a story topic popularity score of the story boundary framework. In various embodiments, TIC 122 can output one or more story topic popularity scores based on the analysis of: contributor profile information, the story boundary framework, the identified concepts, the identified keywords, biometric data, or metadata. For example, if the analysis of the contributors' profiles show a split in superhero interest, but a majority of contributors provide positive feedback while engaging in social media content pertaining to the story boundary framework, the story topic popularity score generated will be high. In various embodiments, the story topic popularity score can be determined using a predetermined threshold or analysis. In an embodiment, TIC 122 predicts whether a story will be successful, for example as a book or movie, based on the story topic popularity score. In one embodiment, TIC 122 generates and transmits a report that includes the story topic popularity score to the story writer, via user interface 106. In a further embodiment, the report may include one or more of the relationship diagrams, the one or more story topics, and the story boundary framework, in addition to the popularity score. In one embodiment, TIC 122 displays the report on a screen associated with computing device 110. In another embodiment, TIC 122 sends the report to the user via an email or text message.

Figure 4:
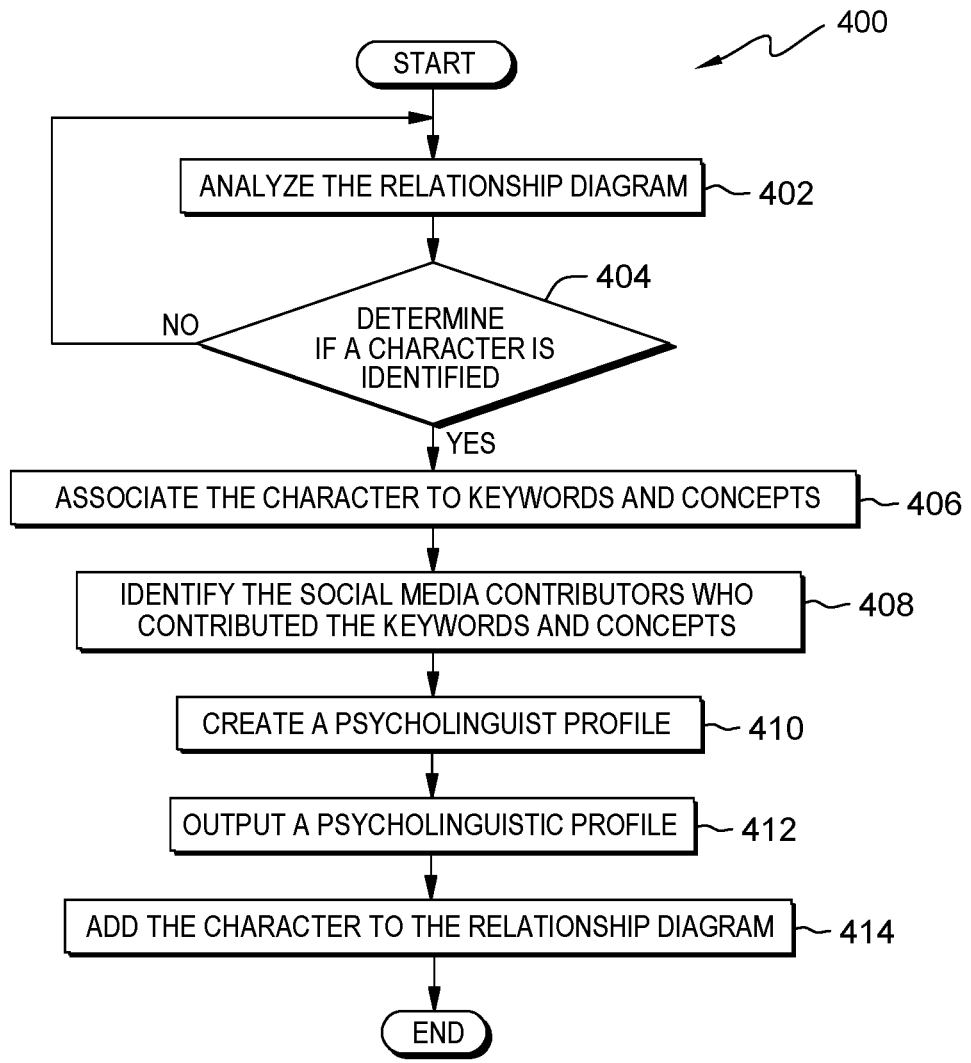
FIG. 4 is a flowchart depicting operational steps of a character identification component, on the server computer within the distributed data processing environment of FIG. 1, for character development, in accordance with an embodiment of the present invention.

FIG. 4 is a flowchart depicting operational steps of CIC 123, generally designated 400, on server computer 120 within distributed data processing environment 100 of FIG. 1, for character development, in accordance with an embodiment of the present invention. FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

In step 402, CIC 123 analyzes the relationship diagram. In various embodiments, CIC 123 analyzes one or more relationship diagrams, as described with respect to FIG. 3, to determine one or more characters, i.e., a character type or character role, who perform activities or actions associated with keywords and concepts in the relationship diagram. In an embodiment, CIC 123 analyzes the relationship diagram and the story boundary framework, as described with respect to FIG. 3. In various embodiments, a user can select a particular action for which CIC 123 can identify the character, via semantic analysis. In other embodiments, a user can select one or more characters for which CIC 123 determines activities or actions, via semantic analysis. In some embodiments, CIC 123 can automatically determine characters based on the semantic analysis of one or more relationship diagrams.

In step 404, CIC 123 determines whether the analysis resulted in a character identification. If CIC 123 identifies at least one character ("yes" branch, step 404), then CIC 123 advances to step 406. If CIC 123 does not identify a character ("no" branch, step 404), then CIC 123 returns to step 402.

In step 406, CIC 123 associates the identified character with keywords and concepts. In various embodiments, CIC 123 associates one or more characters identified in the previous step with one or more keywords or one or more concepts from the one or more relationship diagrams. For example, using the dinosaur petting zoo example above, CIC 123 associates the keywords and concepts of observe, dinosaur behavior, and zoo to a "Dinosaur Zoologist." In one embodiment, CIC 123 can associate characters with existing text, such as a story or a script. For example, CIC 123 associates the actions of "feeding," and "caring" for the dinosaurs from a script to the "Dinosaur Zoologist." In another example, CIC 123 identifies a velociraptor as a character because the term is a noun and linked to the keyword of "dinosaurs" via contextual analysis. In the example, CIC 123 can identify more information (e.g., character information, personality traits, behaviors, facts, etc.) on velociraptors by searching and analyzing social media content about dinosaurs, in general, and specifically, velociraptors. In the example, if CIC 123 does not identify sufficient information on the velociraptor in the initial social media content, then CIC 123 searches for related information on dinosaurs and velociraptors using social media content on a different social media network. In various embodiments, CIC 123 can search and identify related social media content by searching for keywords and concepts on one or more social media networks, via a search engine or one or more "hashtags." In some embodiments, CIC 123 conducts character background searches automatically until a predetermined threshold of acceptance is met. For example, CIC 123 searches until CIC 123 has identified at least 50 keywords and concepts related to a character or until CIC 123 identifies the character in at least 60 social media posts, where the number is predefined by the user.

In step 408, CIC 123 identifies the social media content contributors who contributed the keywords and concepts. In various embodiments, CIC 123 identifies one or more users who contributed to the social media content (i.e., contributors) from which TIC 122 extracted keywords and concepts to create the relationship diagram, as described with respect to FIG. 3. Continuing the previous example, CIC 123 identifies User 1 and User 2 as contributors of keywords and concepts to the dinosaur story topic boundary found in the relationship diagram.

In step 410, CIC 123 creates a psycholinguistic profile for the character based on the identified social media content contributors. In various embodiments, CIC 123 creates one or more psycholinguistic profiles for each of the on one or more identified social media content contributors who mentioned the keywords and concepts associated with the one or more characters. In the embodiment, CIC 123 aggregates the psycholinguistic profiles of the contributors to create a psycholinguistic profile for the character. In another embodiment, CIC 123 identifies other social media contributions from the contributors' social media content or social network profiles in order to aggregate social media content, data from the social network profile, biometric data, and metadata to create a psycholinguistic profile associated with a character. CIC 123 can tag one or more characters with the identified one or more personality traits from the psycholinguistic profile. In various embodiments, CIC 123 uses a contextual analysis engine to create a basic structure of the character based on a movie script, wherein CIC 123 maps the identified characters of the story topic with an appropriate script of the story based on the one or more psycholinguistic profiles.

Continuing the example above, while searching social media content for information on velociraptors, CIC 123 identifies a University Professor who specializes in dinosaur behavior in a social media post and associates character traits of the University Professor with a character in the storyline, script, or story boundary framework (e.g., the Dinosaur Zoologist). CIC 123 conducts research to find more information, via social media content, associated with the University Professor/Dinosaur Zoologist. In the example, CIC 123 can aggregate, identify, and extract the social media content, data from the social network profile, and biometric data associated with the University Professor with a Doctor of Philosophy in dinosaur behavior to generate a psycholinguistic profile and tag the generated psycholinguistic profile to the Dinosaur Zoologist character (e.g., character in a storyline).

In step 412, CIC 123 outputs the psycholinguistic profile. In various embodiments, CIC 123 can output one or more psycholinguistic profiles for one or more characters based on the data gathered from the one or more contributors. In various embodiments, CIC 123 can identify the behavioral characteristics of the one or more characters based on the psycholinguistic profiles of the one or more contributors, so a story writer can correlate the story character with various known personality traits. Furthermore, in various embodiments, CIC 123 can link the identified psycholinguistic profile of the character with the associated relationship diagram, via keywords and concepts. In various embodiments, this linkage of psycholinguistic profile with keywords and concepts can determine who (i.e., which character in a storyline) should play a particular role in the story topic based on a contextual analysis of the psycholinguistic profiles and the identified behavior characteristics. In one embodiment, TIC 122 generates and transmits a report that includes the psycholinguistic profile to the story writer, via user interface 106. In one embodiment, TIC 122 displays the report on a screen associated with computing device 110. In another embodiment, TIC 122 sends the report to the story writer via an email or text message.

In some embodiments, CIC 123 performs a contextual analysis of one or more psycholinguistic profiles, one or more relationship diagrams (i.e., keywords and concepts), one or more scripts, one or more social media content, one or more story topics, and the identified behavior characteristics to find a relationship between one or more characters and their role in a storyline or script. In said embodiments, if a character is within a predetermined threshold of degree of acceptance in character or behavioral characteristic matching with one or more psycholinguistic profiles, one or more relationship diagrams, one or more scripts, one or more social media content, or one or more storylines, then CIC 123 assigns a role to one or more characters. In various embodiments, responsive to determining which character should play a particular role, CIC 123 assigns one or more roles to one or more characters based on the psycholinguistic profile, identified behavior characteristics, and the story topic. In various embodiments, CIC 123 can also perform contextual analysis of a social network post and subsequent comments to find additional characters to add to the identified story topic, and CIC 123 also identifies the contextual importance of the identified character in the story.

In various embodiments, CIC 123, via one or more contextual analysis engines, creates a basic structure of one or more character-based story topics and maps the identified characters of the story topic with an appropriate script of the story. In some embodiments, CIC 123 can create a psycholinguistic profile for each character in order to achieve a true representation of the character and in order to be able to determine what actions the character may take in different situations that relate to the true nature of the character. In some embodiments, CIC 123 is not bounded by a predefined ontology, but rather can create a dynamic graph. Additionally, in some embodiments, CIC 123 is not limited by the bounds of an already created story, i.e., CIC 123 can use information from different sources to build up the character's profile and evolve it as the story evolves. In some embodiments, CIC 123 automatically identifies which characters are integral to the story, which characters to include, and which characters to omit, based on the one or more psycholinguistic profiles.

For example, while searching social media content for information on velociraptors, CIC 123 identifies a University Professor who specializes in dinosaur behavior in a social media post about dinosaur hunting behavior and determines that the University Professor fits as a helpful, knowledgeable protagonist in the story boundary framework, identified as the Dinosaur Zoologist who helps the main characters understand dinosaur behavior and escape danger. In the example, the psycholinguistic profile of the Dinosaur Zoologist is based on the University Professor's personality traits, and other information that CIC 123 aggregates, via social media content. Additionally, in the example, CIC 123 can analyze the psycholinguistic profile based on the University Professor to determine the Dinosaur Zoologists responses or reactions to dinosaurs breaking out of their habitats in addition to what skills or expert knowledge the character uses to solve this problem. In the example, CIC 123 can also determine if the Dinosaur Zoologist should be included or omitted from a particular scene based on the story boundary framework or the psycholinguistic profile.

In step 414, CIC 123 adds the character to the relationship diagram. By adding the identified characters to the relationship diagram, in association with the keywords and concepts from which the characters were extracted, CIC 123 associates the characters with the structure of the story topic. In an embodiment, CIC 123 adds the character to the relationship diagram by linking the character to the associated keywords and concepts, as described in step 406. The linkage between the keywords and the character can describe the basic character structure in addition to the psycholinguistic profile. The addition of the character to the relationship diagram gives the story writer a visual reference of a description of the character. In an embodiment, CIC 123 automatically transmits the updated relationship diagram to the story writer, via user interface 106.

In an embodiment where CIC 123 is fully integrated into TIC 122, TIC 122 performs steps 402 through 414.

Figure 5:
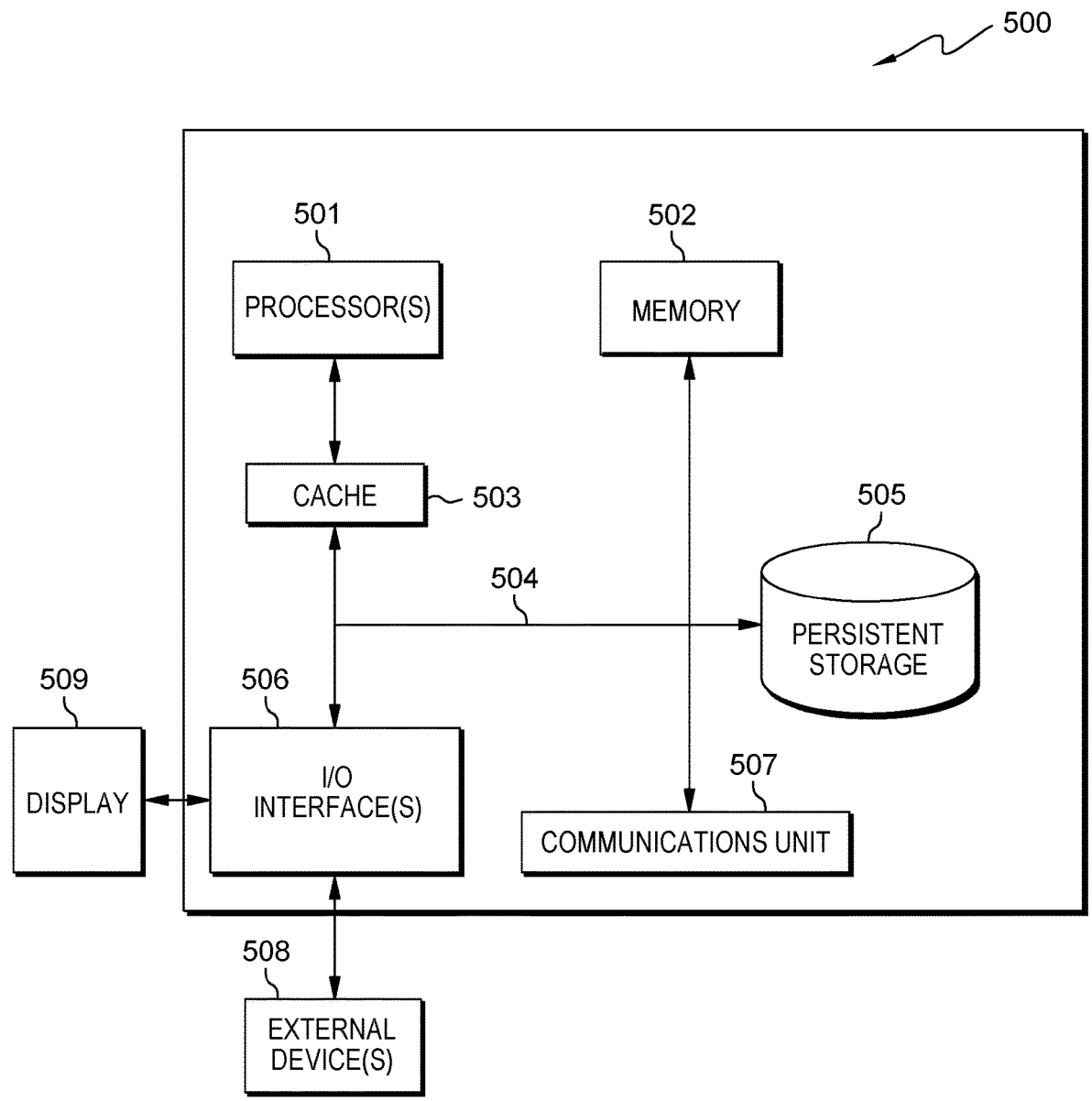
FIG. 5 depicts a block diagram of components of the server computer executing the topic identification component within the distributed data processing environment of FIG. 1, in accordance with an embodiment of the present invention.

FIG. 5 depicts computer system 500, where computer system 500 represents an example of server computer 120 that includes TIC 122. The computer system includes processor(s) 501, cache 503, memory 502, persistent storage 505, communications unit 507, input/output (I/O) interface(s) 506, and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution and/or access by one or more of the respective processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 enables for input and output of data with other devices that may be connected to each computer system. For example, I/O interface 506 may provide a connection to external device(s) 508 such as a keyboard, keypad, a touch screen, and/or some other suitable input devices. External device(s) 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor. Display 509 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for generating a story topic, the method comprising:
   detecting, by one or more computer processors, biometric data associated with one or more users, wherein the one or more users are interacting with at least one social media content;
   collecting, by the one or more computer processors, the at least one social media content;
   analyzing, by the one or more computer processors, the biometric data and the at least one social media content;
   based, at least in part, on the analysis of the biometric data and the at least one social media content, determining, by the one or more computer processors, whether a popularity of the social media content meets a predetermined threshold;
   responsive to determining the popularity of the social media content meets the predetermined threshold, extracting, by the one or more computer processors, one or more keywords and one or more concepts from the social media content;
   based, at least in part, on the extracted one or more keywords and one or more concepts, generating, by the one or more computer processors, one or more story topics; and
   generating, by the one or more computer processors, a report that includes the one or more story topics.

2. The method of claim 1, further comprising:
   based, at least in part, on the extracted one or more keywords and one or more concepts, creating, by the one or more computer processors, a relationship diagram; and
   based, at least in part, on the relationship diagram, creating, by the one or more computer processors, a story boundary framework.

3. The method of claim 2, further comprising:
   determining, by the one or more computer processors, the story boundary framework includes one or more relationship gaps;
   generating, by the one or more computer processors, one or more new social media content to fill the one or more relationship gaps;
   retrieving, by the one or more computer processors, one or more responses to the new social media content;
   generating, by the one or more computer processors, one or more keywords and one or more concepts from the retrieved one or more responses; and
   filling, by the one or more computer processors, the one or more relationship gaps with the generated one or more keywords and one or more concepts.

4. The method of claim 1, wherein the social media content is selected from the group consisting of: a social media post, a social media comment, a reply to a social media comment, a reply to a social media post, a user social network profile, a concept of a social media post, a concept of a social media comment, a concept of a reply, a keyword of a social media post, a keyword of a social media comment, a keyword of a reply, a reaction to a social media post, a reaction to a social media comment, a reaction to a reply, an expressed emotion to a social media post, an expressed emotion to a social media comment, and an expressed emotion to a reply.

5. The method of claim 1, wherein the biometric data is selected from the group consisting of: a blood pressure, a heart rate, a respiratory rate, one or more calories burned, one or more calories consumed, a pulse, an oxygen level, a blood oxygen level, a glucose level, a blood pH level, a salinity of user perspiration, a skin temperature, a galvanic skin response, one or more electrocardiography data, a body temperature, and eye tracking data.

6. The method of claim 1, further comprising:
   identifying, by the one or more computer processors, via semantic analysis, one or more story characters associated with actions associated with the extracted one or more keywords and one or more concepts;
   identifying, by the one or more computer processors, one or more of the one or more users who contributed social media content associated with the extracted one or more keywords and one or more concepts associated with the one or more identified story characters;
   creating, by the one or more processors, a psycholinguistic profile for each of the one or more of the one or more users who contributed social media content associated with the extracted one or more keywords and one or more concepts, wherein the psycholinguistic profile includes attributes selected from the group consisting of: a personality trait, a need, a value, and a social behavior;
   aggregating, by the one or more computer processors, the one or more created psycholinguistic profiles; and
   based, at least in part, on the aggregated psycholinguistic profiles, creating, by the one or more computer processors, a psycholinguistic profile for the one or more identified story characters.

7. The method of claim 6, further comprising, adding, by the one or more computer processors, the one or more identified story characters to an associated relationship diagram.

8. A computer program product for generating a story topic, the computer program product comprising:
- one or more computer readable storage devices and program instructions stored on the one or more computer readable storage devices, the stored program instructions comprising:
- program instructions to detect biometric data associated with one or more users, wherein the one or more users are interacting with at least one social media content;
- program instructions to collect the at least one social media content;
- program instructions to analyze the biometric data and the at least one social media content;
- based, at least in part, on the analysis of the biometric data and the at least one social media content, program instructions to determine whether a popularity of the social media content meets a predetermined threshold;
- responsive to determining the popularity of the social media content meets the predetermined threshold, program instructions to extract one or more keywords and one or more concepts from the social media content;
- based, at least in part, on the extracted one or more keywords and one or more concepts, program instructions to generate one or more story topics; and
- program instructions to generate a report that includes the one or more story topics.

9. The computer program product of claim 8, the stored program instructions further comprising:
- based, at least in part, on the extracted one or more keywords and one or more concepts, program instructions to create a relationship diagram; and
- based, at least in part, on the relationship diagram, program instructions to create a story boundary framework.

10. The computer program product of claim 9, the stored program instructions further comprising:
- program instructions to determine the story boundary framework includes one or more relationship gaps;
- program instructions to generate one or more new social media content to fill the one or more relationship gaps;
- program instructions to retrieve one or more responses to the new social media content;
- program instructions to generate one or more keywords and one or more concepts from the retrieved one or more responses; and
- program instructions to fill the one or more relationship gaps with the generated one or more keywords and one or more concepts.

11. The computer program product of claim 8, wherein the social media content is selected from the group consisting of: a social media post, a social media comment, a reply to a social media comment, a reply to a social media post, a user social network profile, a concept of a social media post, a concept of a social media comment, a concept of a reply, a keyword of a social media post, a keyword of a social media comment, a keyword of a reply, a reaction to a social media post, a reaction to a social media comment, a reaction to a reply, an expressed emotion to a social media post, an expressed emotion to a social media comment, and an expressed emotion to a reply.

12. The computer program product of claim 8, wherein the biometric data is selected from the group consisting of: a blood pressure, a heart rate, a respiratory rate, one or more calories burned, one or more calories consumed, a pulse, an oxygen level, a blood oxygen level, a glucose level, a blood pH level, a salinity of user perspiration, a skin temperature, a galvanic skin response, one or more electrocardiography data, a body temperature, and eye tracking data.

13. The computer program product of claim 8, the stored program instructions further comprising:
- program instructions to identify, via semantic analysis, one or more story characters associated with actions associated with the extracted one or more keywords and one or more concepts;
- program instructions to identify one or more of the one or more users who contributed social media content associated with the extracted one or more keywords and one or more concepts associated with the one or more identified story characters;
- program instructions to create a psycholinguistic profile for each of the one or more of the one or more users who contributed social media content associated with the extracted one or more keywords and one or more concepts, wherein the psycholinguistic profile includes attributes selected from the group consisting of: a personality trait, a need, a value, and a social behavior;
- program instructions to aggregate the one or more created psycholinguistic profiles; and
- based, at least in part, on the aggregated psycholinguistic profiles, program instructions to create a psycholinguistic profile for the one or more identified story characters.

14. The computer program product of claim 13, the stored program instructions further comprising program instructions to add the one or more identified story characters to an associated relationship diagram.

15. A computer system for generating a story topic, the computer system comprising:
- one or more computer processors;
- one or more computer readable storage devices;
- program instructions stored on the one or more computer readable storage devices for execution by at least one of the one or more computer processors, the stored program instructions comprising:
- program instructions to detect biometric data associated with one or more users, wherein the one or more users are interacting with at least one social media content;
- program instructions to collect the at least one social media content;
- program instructions to analyze the biometric data and the at least one social media content;
- based, at least in part, on the analysis of the biometric data and the at least one social media content, program instructions to determine whether a popularity of the social media content meets a predetermined threshold;
- responsive to determining the popularity of the social media content meets the predetermined threshold, program instructions to extract one or more keywords and one or more concepts from the social media content;
- based, at least in part, on the extracted one or more keywords and one or more concepts, program instructions to generate one or more story topics; and
- program instructions to generate a report that includes the one or more story topics.

16. The computer system of claim 15, the stored program instructions further comprising:
- based, at least in part, on the extracted one or more keywords and one or more concepts, program instructions to create a relationship diagram; and
- based, at least in part, on the relationship diagram, program instructions to create a story boundary framework.

17. The computer system of claim 16, the stored program instructions further comprising:
- program instructions to determine the story boundary framework includes one or more relationship gaps;
- program instructions to generate one or more new social media content to fill the one or more relationship gaps;
- program instructions to retrieve one or more responses to the new social media content;
- program instructions to generate one or more keywords and one or more concepts from the retrieved one or more responses; and
- program instructions to fill the one or more relationship gaps with the generated one or more keywords and one or more concepts.

18. The computer system of claim 15, wherein the social media content is selected from the group consisting of: a social media post, a social media comment, a reply to a social media comment, a reply to a social media post, a user social network profile, a concept of a social media post, a concept of a social media comment, a concept of a reply, a keyword of a social media post, a keyword of a social media comment, a keyword of a reply, a reaction to a social media post, a reaction to a social media comment, a reaction to a reply, an expressed emotion to a social media post, an expressed emotion to a social media comment, and an expressed emotion to a reply.

19. The computer system of claim 15, wherein the biometric data is selected from the group consisting of: a blood pressure, a heart rate, a respiratory rate, one or more calories burned, one or more calories consumed, a pulse, an oxygen level, a blood oxygen level, a glucose level, a blood pH level, a salinity of user perspiration, a skin temperature, a galvanic skin response, one or more electrocardiography data, a body temperature, and eye tracking data.

20. The computer system of claim 15, the stored program instructions further comprising:
- program instructions to identify, via semantic analysis, one or more story characters associated with actions associated with the extracted one or more keywords and one or more concepts;
- program instructions to identify one or more of the one or more users who contributed social media content associated with the extracted one or more keywords and one or more concepts associated with the one or more identified story characters;
- program instructions to create a psycholinguistic profile for each of the one or more of the one or more users who contributed social media content associated with the extracted one or more keywords and one or more concepts, wherein the psycholinguistic profile includes attributes selected from the group consisting of: a personality trait, a need, a value, and a social behavior;
- program instructions to aggregate the one or more created psycholinguistic profiles; and
- based, at least in part, on the aggregated psycholinguistic profiles, program instructions to create a psycholinguistic profile for the one or more identified story characters.

* * * * *